United States Patent [19]
Yamazaki et al.

[11] Patent Number: 5,572,345
[45] Date of Patent: Nov. 5, 1996

[54] LIQUID CRYSTAL DEVICE FOR PREVENTING SHORT CIRCUITING THEREIN

[75] Inventors: Shunpei Yamazaki, Tokyo; Toshimitsu Konuma; Toshiji Hamatani, both of Atsugi, all of Japan

[73] Assignee: Semiconductor Energy Laboratory Co., Ltd., Kanagawa-ken, Japan

[21] Appl. No.: 74,163

[22] Filed: Jun. 9, 1993

Related U.S. Application Data

[63] Continuation-in-part of Ser. No. 277,437, Nov. 28, 1988, abandoned, which is a continuation of Ser. No. 23,399, Mar. 9, 1987, abandoned, which is a continuation of Ser. No. 494,957, Mar. 15, 1990, abandoned.

[30] Foreign Application Priority Data

Mar. 11, 1986 [JP] Japan .................................. 61-53974

[51] Int. Cl.$^6$ ...................... G02F 1/1335; G02F 1/1333; G02F 1/13
[52] U.S. Cl. .................. 359/62; 359/74; 359/77; 359/79; 359/82; 359/104
[58] Field of Search .............................. 350/339 R, 340, 350/341, 334; 428/36.6; 359/62, 77, 78, 74, 79, 82, 104

[56] References Cited

U.S. PATENT DOCUMENTS

| | | | |
|---|---|---|---|
| 4,082,854 | 4/1978 | Yamada et al. | 428/36.6 |
| 4,367,924 | 1/1983 | Clark et al. | 359/104 |
| 4,391,491 | 7/1983 | Freer et al. | 350/341 |
| 4,494,824 | 1/1985 | Nakamura et al. | 350/339 R |
| 4,519,678 | 5/1985 | Komatsubara et al. | 350/339 R |
| 4,588,538 | 5/1986 | Chung et al. | 264/29.2 |
| 4,601,948 | 7/1986 | Lancaster et al. | 428/349 |
| 4,709,991 | 12/1987 | Hoshikawa | 350/339 R |
| 4,730,903 | 3/1988 | Yamazaki et al. | 359/79 |
| 4,738,515 | 4/1988 | Okada et al. | 350/339 R |
| 5,078,475 | 1/1992 | Sekimura et al. | 359/79 |

FOREIGN PATENT DOCUMENTS

| | | | |
|---|---|---|---|
| 57-0169728 | 10/1982 | Japan | 350/339 R |
| 58-111919 | 7/1983 | Japan | 350/339 R |
| 59-200216 | 11/1984 | Japan | 350/339 R |
| 2072368 | 9/1981 | United Kingdom | 350/339 R |

*Primary Examiner*—David C. Nelms
*Assistant Examiner*—Trong Phan
*Attorney, Agent, or Firm*—Sixbey, Friedman, Leedom & Ferguson, P.C.; Gerald J. Ferguson, Jr.

[57] ABSTRACT

An improved liquid crystal device free from current shortage. A pair of substrates confine therebetween a liquid crystal layer and their inner surfaces are provided with a pair of electrodes. In advance of joining the substrates, the insides of the substrates are made even by coating with an organic resin layer. Any projection is buried in the organic resin and the even inside of the substrate is produced.

24 Claims, 5 Drawing Sheets

LIQUID CRYSTAL DEVICE FOR PREVENTING SHORT CIRCUITING THEREIN

This application is a continuation-in-part of U.S. patent application Ser. No. 07/277,437, filed Nov. 28, 1988, now abandoned, was a continuation of U.S. patent application Ser. No. 023,399, filed Mar. 9, 1987 which was a continuation of U.S. patent application Ser. No. 07/494,957, filed Mar. 15, 1990, now abandoned.

BACKGROUND OF THE INVENTION

The present invention relates to liquid crystal devices, more particularly to liquid crystal devices having a pair of electrodes between which a liquid crystal layer is disposed.

Heretofore, liquid crystal devices have been employed for displays of microcomputers, word processors and compact televisions. Such a display is economical because of its small electricity consumption and suitable for compact apparatus.

FIG. 1 is a cross section view of a prior art liquid crystal device. The liquid crystal device comprises a pair of glass substrates 1 and 1' with polarizing plates 5 and 5' on the outsides of the pair of the substrate, a plurality of pairs of transparent electrodes 2 and 2' between which pixels are defined, oriented films 3 and 3' formed on the opposed inner surfaces of the substrates 1 and 1' and a liquid crystal layer disposed between the substrates.

To save the amount of the expensive liquid crystal necessary to form the liquid crystal layer, realize quick response of the device and make the device thin, the distant between the substrates is chosen narrow, e.g., about 1 to 20 microns. Because of such thin structure, when the substrates are assembled, a convex portion of the inner surface of one substrate with the height greater than the distant between the substrates could touch its counterpart surface and give rise to a short current path between the electrodes. As a result, such a liquid crystal device can not function normally. The substrates, therefore, have to be polished to make the opposed inners surface even. However, if flaws are inadvertently given to the substrate during assembling, the assembled device might have short current paths. Even if the height of a convex portion is less than the distance between the substrates, the transparent electrode 2 or 2' is particularly grown with the convex portion as a core during deposition of this, and and therefore is in contact with the opposite inner surface might happen.

The tolerable difference in distance between the opposed surfaces contiguously to a liquid crystal layer is about 2 to 3 microns, preferably the difference is less than 0.3 micron, when the liquid crystal device is 10 cm long by 10 cm wide.

SUMMARY OF THE INVENTION

It is therefore an object of the invention to provide an improved liquid crystal device free from incurring short current paths between its facing electrodes.

It is another object of the invention to provide a liquid crystal device which can be manufactured by an easy process with a high yield.

DETAILED DESCRIPTION OF THE PREFERRED EMBODIMENT

Figure 1:
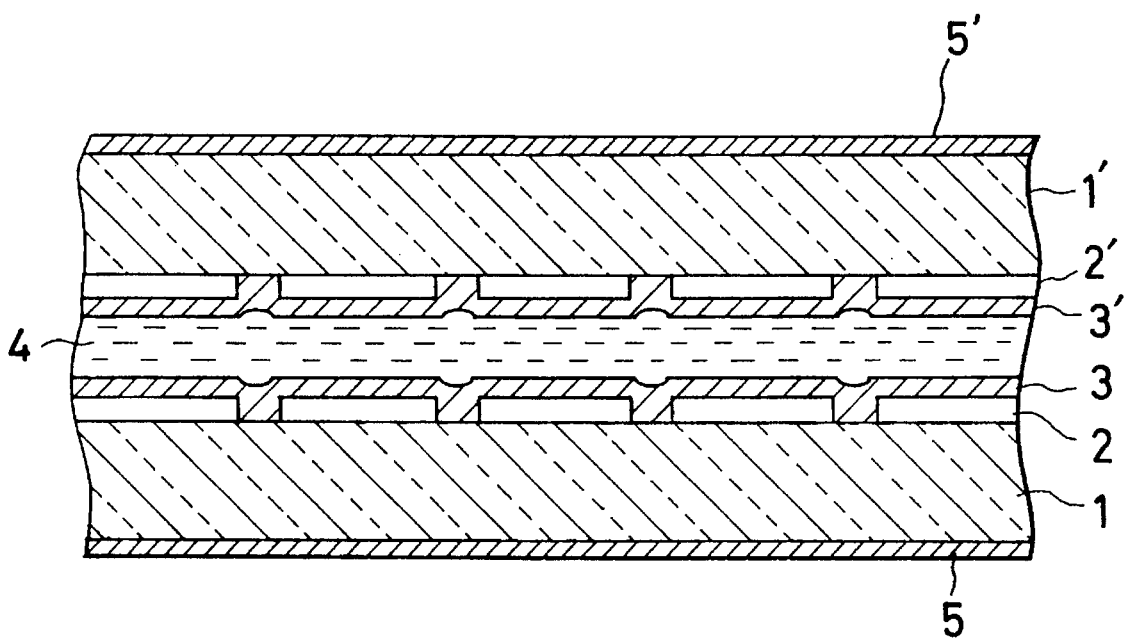
FIG. 1 is a section view showing a prior art liquid crystal device.
Figure 2:
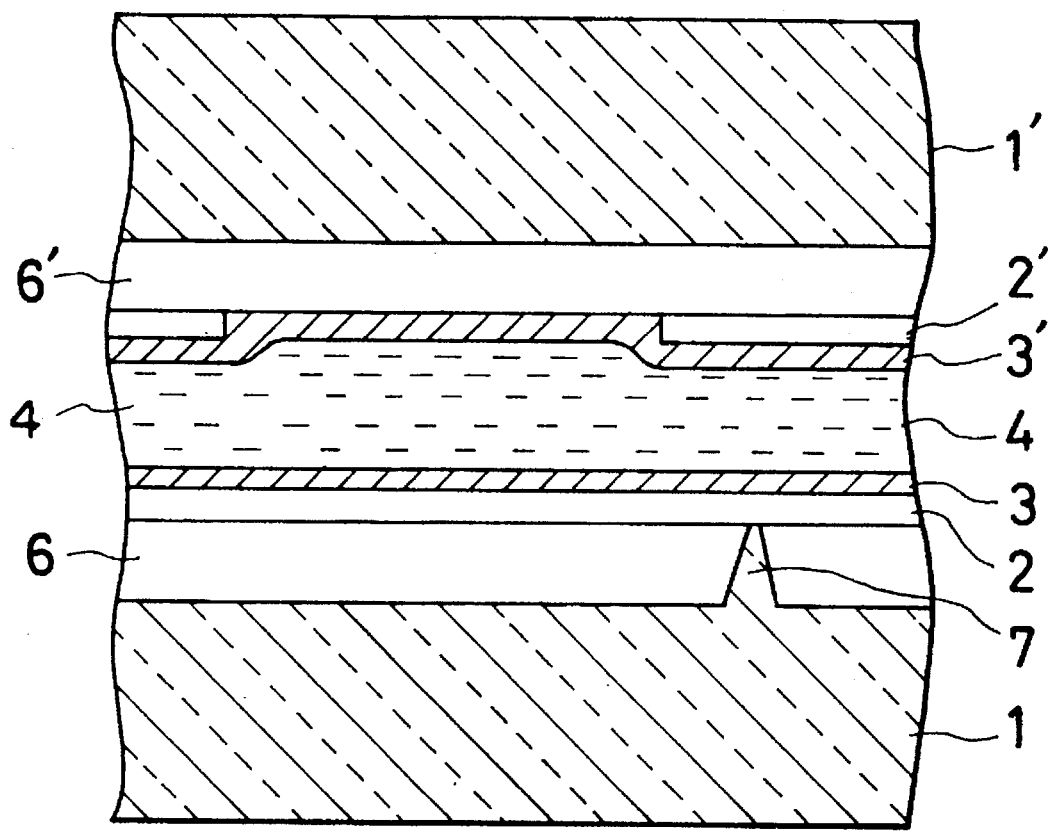
FIG. 2 is a section view showing an embodiment of the present invention.

Referring now to FIG. 2, a liquid crystal device according to the invention is illustrated. The device composed of a pair of substrates 1 and 1', organic resin layers 6 and 6' on the opposed inner surfaces of the substrates 1 and 1', an electric circuit including a pair of electrode 2 and 2'forming circuit elements of the electric circuit, a pair of oriented films 3 and 3' and a liquid crystal layer 4 disposed between the substrates. At least one of the substrates 1 and 1' is transparent and the organic resin layer on the transparent substrate preferably is transparent. The electrode 2 comprises a plurality of conductive parallel strips extending in the longitudinal direction, while the electrode 2' comprises a plurality of conductive parallel strips extending in the direction normal to the plane of the drawing. Namely a matrix of pixels are defined by the two sets of parallel electrodes. The oriented films 3 and 3' are prepared and aligned suitable for the action of the liquid crystal layer 4. For instance, when the device is designed for memory with chiral smectic tilted liquid crystal, the oriented film can be dispensed with. For further instance, when the device is designed for display with nematic liquid crystal, oriented films are prepared on the opposed surfaces of the substrates with the orientations perpendicular to each other.

The organic resin layers 6 and 6' are provided in order to make even inner surface of the substrates 1 and 1'.

The substrates 1 and 1' are provided with even inner surfaces by the organic resin layers 6 and 6', and therefore surface polish treatment is dispensed with. The organic resin layers 6 and 6' are spread throughout the substrates by spin coating with tens microns in thickness. By virtue of the organic resin layers 6 and 6', even if the substrate 1 has a projection 7 on its surface, it is buried in the organic resin layer 6 and can not raise the overlying electrode 2 to a level touching the counterpart electrode 2'.

As can be seen from FIG. 2, the substrate 1 includes the projection 7 whose size is on the order of several microns. Consequently, the organic resin layer 6 must be provided between the electrodes 2 and the substrate 1 in order to maintain the surface of the substrate 1 level. It should be noted that the thickness of the organic resin layer 6 must not be less than the height of the projection 7. More particularly and preferably, the thickness of the organic resin layer 6 should not be less than that of the liquid crystal layer 4.

On the substrate(s) one or two polarizing plates may be provided for memory or display purpose.

EXPERIMENT 1

As a substrates 1 and 1' soda-lime-silicate glass substrates with 1.1 microns in width were employed. On the substrate are projections and depressions of about several microns depth and height. The surface of the substrates were not polished. One surface of each substrates was coated with transparent polyimide to a thickness of 10 microns and the polyimide layers 6 and 6' were cured at 200° to 300° C. Over the layers 6 and 6' were formed electrodes made of SnO₂ by sputtering with about 2000Å in thickness. Each electrode was prepared of ten parallel strips. Consequently one hundred pixels were formed between the substrates. Further, throughout the inner surfaces of the substrates a pair of oriented films were prepared. The two substrates thus provided were joined facing each other with a distance of 5 microns between the inner surfaces. Then liquid crystal was charged between the substrates and the periphery of the joined substrates was sealed off by adhesive.

Out of the thousand pixels of ten devices prepared by the process as described above, no short current path was formed while twelve current shortages were observed on ten prior art devices, each also having 100 pixels.

EXPERIMENT 2

Figure 3:
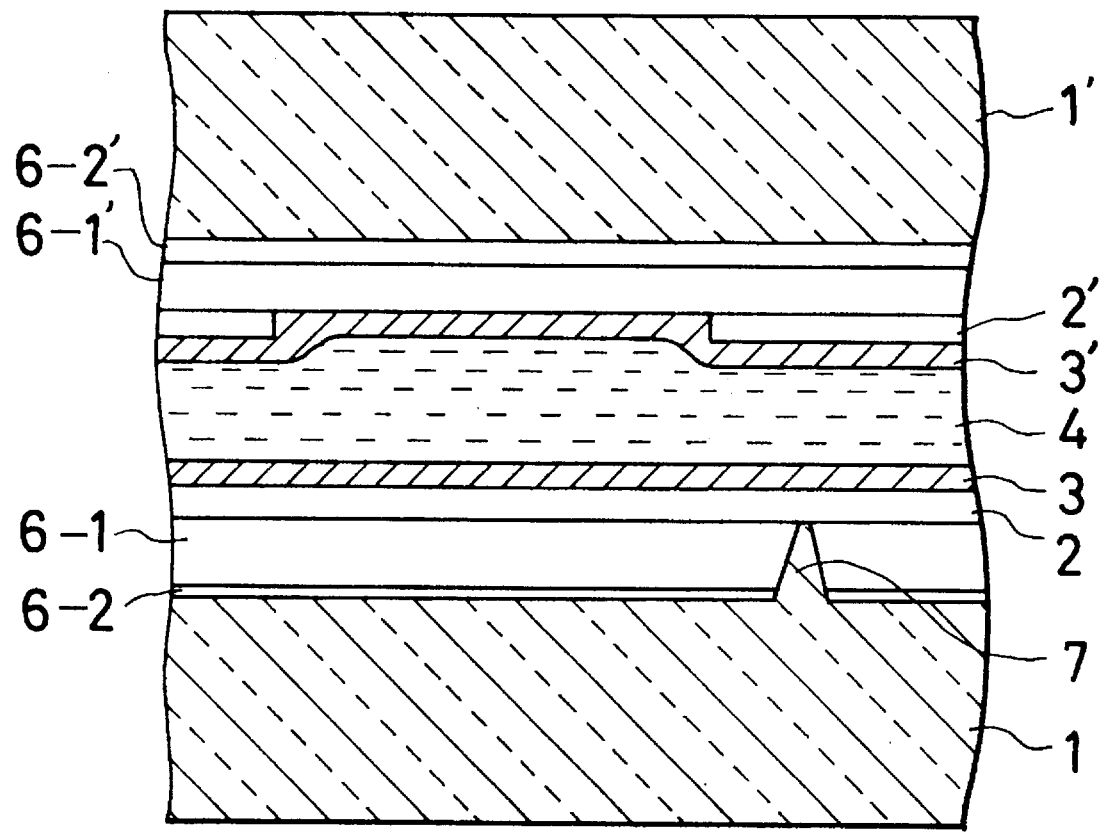
FIG. 3 is a section view showing a variation of the embodiment according to the present invention.

In this experiment each organic resin layer composed of two layers were formed as shown in FIG. 3. The underlying layers 6-1 and 6'-1 were formed of an adhesive, ethylenevinylalcohol, and the overlying layers 6-2 and 6'-2 were formed of organic resin, polyetheretherketon. The thickness of the overlying layer is about 50 microns. The other configuration was same as that of the previous described experiment.

Figure 4:
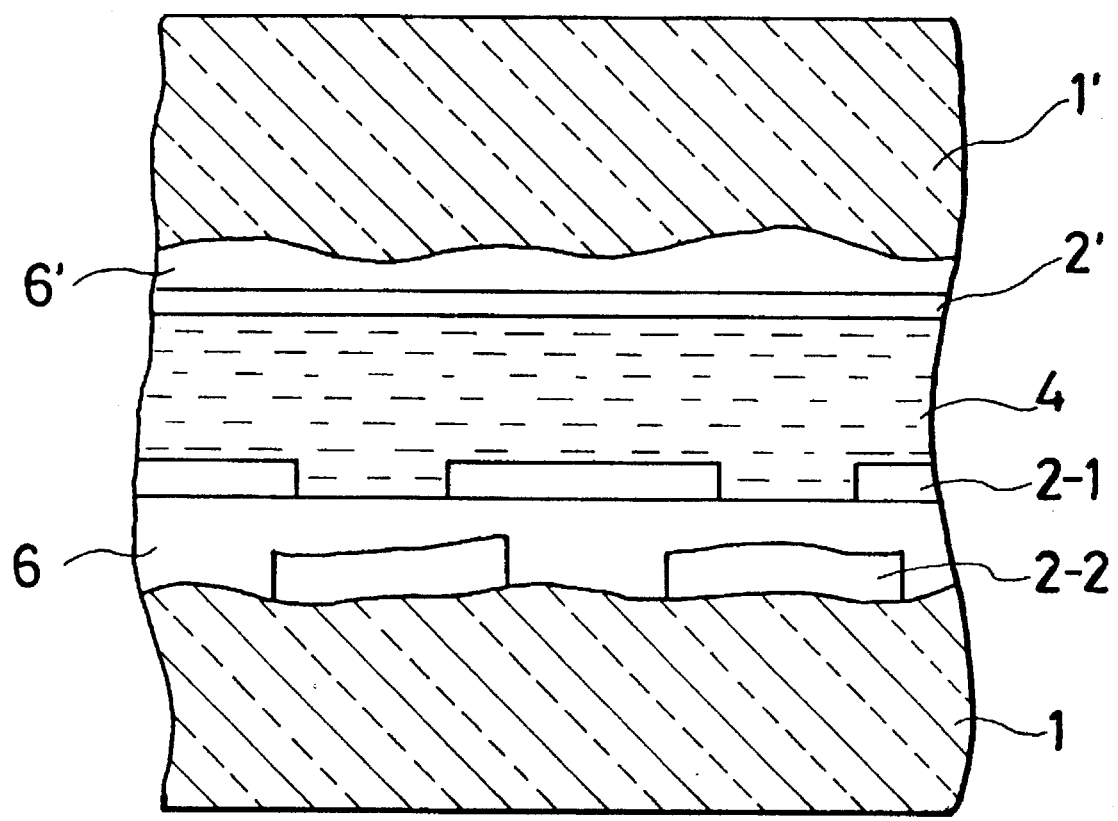
FIG. 4 is a section view showing a second embodiment of the invention.
Figure 5:
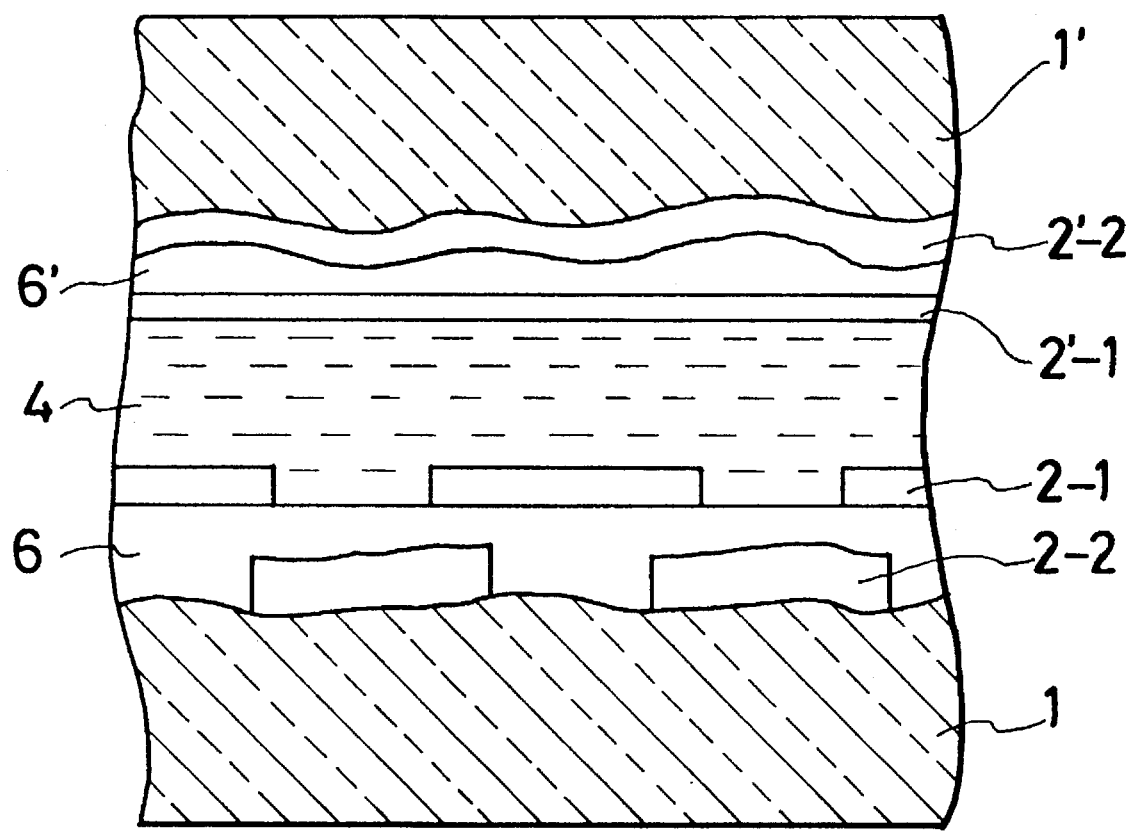
FIG. 5 is a section view showing a third embodiment of the invention.

FIGS. 4 and 5 are section views showing embodiments of another type in accordance with the invention. In this type of device, the nearest layer is not an organic resin.

Referring to FIG. 4, a second embodiment of the invention is illustrated. The upper glass substrate 1' is made even by applying an organic resin layer and provided thereon with a transparent electrode. On the other substrate 1 is initially provided on the inner side an electrode arrangement 2-2, and thereafter the inner surface is made even by applying an organic resin over the electrode arrangement. A further electrode arrangement 2-1 is formed on the flat inner surface. The multi-layered electrode arrangement is used for AC bias method in which the inner electrode 2-1 change and determines the state of the liquid crystal layer and the outer electrode serves to prepare a certain initial condition of the liquid crystal layer in advance of the operation of the inner electrode 2-1. The preparation condition of this embodiment is same as that of the previous embodiment.

Referring to FIG. 5, a third embodiment of the invention is illustrated. This is prepared in same configuration as the second embodiment except for an inner electrode 2'-2 provided contiguous to the inner surface of the glass substrate 1'.

While particular embodiment and experiment are described, the present invention should not limited thereto but limited only to the appending claims. For instance, although the above embodiment is employed a pair of resin layer on the opposed inner surfaces, it is also advantageous even if only one of the resin layers is prepared because the single resin layer can block a projection on the opposed surface, not prepared with the resin layer, from touching the counterpart.

What is claimed is:

1. A liquid crystal device comprising:
   a pair of substrates, at least one of said substrates comprising a transparent glass substrate;
   an electrode arrangement comprising a conductive thin film formed on each of said substrates; and
   a liquid crystal layer disposed between said substrates;
   wherein an insulating organic resin layer is interposed between an inside surface of each of said substrates and the conductive thin film in order to make even a surface of the conductive thin film to prevent any projections on said glass substrates from creating a short circuit between said conductive thin films; and
   said liquid crystal layer and said insulating organic resin layers have respective thicknesses such that the thickness of each insulating organic resin layer is not less than the thickness of said liquid crystal layer.

2. The device of claim 1, wherein said organic resin layer is a spin coating.

3. The device of claim 1, wherein said organic resin is transparent polyimide.

4. The device of claim 1, wherein said organic resin is polyetheretherkton.

5. The device of claim 1, wherein said organic resin is a thermosetting material.

6. The device of claim 1 further comprising a layer of adhesive disposed between the inside surface of each of said substrates and said insulating organic resin layer.

7. The device of claim 6 wherein said adhesive is ethylenevinyl-alcohol.

8. A method for forming a liquid crystal device comprising:
   providing a pair of substrates, at least one of said substrates comprising a transparent glass substrate;
   providing an electrode arrangement comprising a conductive thin film on each of said substrates; and
   providing a liquid crystal layer between said pair of substrates;
   wherein an insulating organic resin layer is interposed between an inside surface of each of said substrates and the conductive thin film in order to make even a surface of the conductive thin film to prevent any projections on said glass substrates from creating a short circuit between said conductive thin films, wherein the thickness of each of said insulating organic resin layers is not less than the thickness of said liquid crystal layer.

9. The method of claim 8 wherein said organic resin layer is formed by spin coating.

10. The method of claim 8 further comprising the step of curing said organic resin layer.

11. The method of claim 8 wherein said forming step further comprising a sub-step of applying an adhesive to the inside surface of each of said substrates in advance of forming said organic resin layer.

12. The method of claim 8 wherein said conductive film is formed by sputtering.

13. The method of claim 10 wherein said organic resin layer is cured at 200°–300° C.

14. The method of claim 8 further comprising the step of forming an orientation control film on the electrode arrangement.

15. A liquid crystal device comprising:
   a pair of transparent substrates opposed to each other, each of said transparent substrates having a transparent electrode formed over an inner surface thereof;
   a liquid crystal layer interposed between said pair of transparent substrates; and
   a transparent organic resin film formed between at least one of said transparent substrates and the associated transparent electrode,
   wherein said transparent organic resin film provides a leveled upper surface for said associated transparent electrode.

16. The liquid crystal device of claim 15 wherein said associated transparent electrode directly contacts the leveled upper surface of the transparent organic resin film.

17. The liquid crystal device of claim 15 wherein said associated transparent electrode directly contacts the leveled upper surface of the transparent organic resin film.

18. The liquid crystal device of claim 15 wherein said transparent organic resin film is formed over an entire surface of said at least one of said transparent substrates.

19. The liquid crystal device of claim 15 further comprising an adhesive layer provided on said transparent organic resin film.

20. The liquid crystal device of claim 32 wherein said adhesive layer comprises ethylenevinylalcohol, and said transparent organic resin film comprises polyetheretherketon.

21. A liquid crystal device comprising:

a first transparent substrate having a first transparent electrode formed thereon;

a second transparent substrate opposed to said first transparent substrate, said second transparent substrate having a wiring formed thereon;

a transparent organic resin film formed over said second transparent substrate having said wiring formed thereon, said transparent organic resin film having a leveled upper surface;

a second transparent electrode formed on the leveled upper surface of the organic resin film; and a liquid crystal layer interposed between said first and second transparent substrates.

22. The liquid crystal device of claim 21 wherein said second transparent electrode directly contacts the leveled upper surface of the transparent organic resin film.

23. The liquid crystal device of claim 2 wherein said transparent organic resin film comprises a polyimide.

24. The liquid crystal device of claim 21 wherein said transparent organic resin film is formed over an entire surface of said second transparent substrate.

* * * * *